US011816542B2

(12) United States Patent
Cmielowski et al.

(10) Patent No.: US 11,816,542 B2
(45) Date of Patent: Nov. 14, 2023

(54) FINDING ROOT CAUSE FOR LOW KEY PERFORMANCE INDICATORS

(71) Applicant: International Business Machines Corporation, Armonk, NY (US)

(72) Inventors: Lukasz G. Cmielowski, Cracow (PL); Rafal Bigaj, Kracow (PL); Wojciech Sobala, Cracow (PL); Maksymilian Erazmus, Zasow (PL)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 16/733,552

(22) Filed: Jan. 3, 2020

(65) Prior Publication Data
US 2021/0081833 A1    Mar. 18, 2021

(30) Foreign Application Priority Data

Sep. 18, 2019  (EP) .................................... 19198001

(51) Int. Cl.
*G06N 20/00*    (2019.01)
*G06F 17/15*    (2006.01)
(Continued)

(52) U.S. Cl.
CPC ............. *G06N 20/00* (2019.01); *G06F 17/15* (2013.01); *G06F 17/16* (2013.01); *G06F 18/23213* (2023.01)

(58) Field of Classification Search
None
See application file for complete search history.

(56) References Cited

U.S. PATENT DOCUMENTS 11,122,058 B2 * 9/2021 Abu-Nimeh ...... G06F 16/24578
11,182,695 B1 * 11/2021 Kirsche ..................... G06F 9/54
(Continued)

FOREIGN PATENT DOCUMENTS

CN        107659595 A      2/2018
CN     201910316760     *  4/2019 ............. G06F 11/30
(Continued)

OTHER PUBLICATIONS

Survey of Clustering Algorithms, Xu et al., IEEE Transactions on Neural Networks, vol. 16, No. 3, May 2005.*
(Continued)

*Primary Examiner* — David J Stoltenberg
(74) *Attorney, Agent, or Firm* — Stephen R. Yoder

(57) ABSTRACT

Identifying a change of an indicator value for a system of interdependent entities includes determining the indicator value, logging input data for the system of interdependent entities, logging scoring payload data and related results of a machine-learning model used as part of the system of interdependent entities, wherein the scoring payload data are derived from the input data, clustering the input data into a number of clusters resulting in defined clusters, determining metric values of the machine-learning model by mapping each of the defined clusters onto the scoring payload data resulting in a vector of metric values, re-determining the indicator value for each defined cluster, resulting in a vector of re-calculated indicator values, and determining correlation matrix values for a matrix between the vector of re-determined indicator values and the vector of the metric values for each of the defined clusters.

20 Claims, 6 Drawing Sheets

(51) Int. Cl.
*G06F 17/16* (2006.01)
*G06F 18/23213* (2023.01)

(56) References Cited

U.S. PATENT DOCUMENTS

| | | | | |
|---|---|---|---|---|
| 2004/0266442 | A1* | 12/2004 | Flanagan | H04W 16/18 |
| | | | | 455/445 |
| 2012/0158364 | A1* | 6/2012 | Luchi | G06F 11/3452 |
| | | | | 702/186 |
| 2014/0229482 | A1* | 8/2014 | Milenova | G06F 16/21 |
| | | | | 707/737 |
| 2017/0034720 | A1* | 2/2017 | Gopalakrishnan | H04W 16/18 |
| 2017/0206592 | A1 | 7/2017 | Chen | |
| 2017/0351689 | A1* | 12/2017 | Vasudevan | G06F 40/279 |
| 2018/0025303 | A1* | 1/2018 | Janz | G16H 50/20 |
| | | | | 705/2 |
| 2018/0081912 | A1* | 3/2018 | Suleiman | G06N 7/005 |
| 2019/0356533 | A1* | 11/2019 | Vasseur | G06N 20/10 |
| 2020/0012900 | A1* | 1/2020 | Walters | G06F 9/547 |
| 2020/0065208 | A1* | 2/2020 | Vijendra | G06F 11/3447 |
| 2020/0082013 | A1* | 3/2020 | Triplet | G06K 9/00496 |
| 2020/0387565 | A1* | 12/2020 | Caglar | G06N 3/082 |
| 2021/0019209 | A1* | 1/2021 | Krishnaswamy | G06F 11/0772 |
| 2022/0101140 | A1* | 3/2022 | Satheesh Kumar | G06N 3/08 |

FOREIGN PATENT DOCUMENTS

| | | | | |
|---|---|---|---|---|
| CN | 110033191 | A | 7/2019 | |
| IN | 201821004121 | * | 2/2018 | ............... G06F 8/20 |
| KR | 20180115144 | A | 10/2018 | |
| WO | WO 2018/014674 | * | 6/2017 | ............ H04L 12/24 |

OTHER PUBLICATIONS

Rapid Deployment of Anomaly Detection Models for Large No. of Emerging KPI Streams; Bu et al., 978-1-5386-6808-5/18/$31.00 © 2018 IEEE.*

Clustering Optimisation Techniques in Mobile Networks; Eleni Rozaki; International Journal on Recent and Innovation Trends in Computing and Communication; ISSN: 2321-8169, vol. 4 Issue: 2, IJRITCC | Feb. 2016.*

Cmielowski et al., "Finding Root Cause for Low Key Performance Indicators", European Patent Application EP19198001.0, Filed on Sep. 18, 2019, 37 pages.

Cmielowski et al., "Watson OpenScale & Business KPIs", System for automatic root cause analysis for business KPI value drop, printed on Oct. 11, 2019, 10 pages.

* cited by examiner

400

| Credit approval | Credit type | Interest rate | Interest value | Process cost | Rev. | Score | cluster |
|---|---|---|---|---|---|---|---|
| 0 | cc | 5.7 | 0.00 | 4,992 | -4.992 | 38 | 2 |
| 0 | cc | 4.5 | 0.00 | 0.183 | -0.183 | 22 | 1 |
| 1 | cc | 6.34 | 15.85 | 0.110 | 15.739 | 57 | 1 |
| 0 | cc | 1.51 | 0.00 | 0,776 | -0.176 | 26 | 1 |
| 0 | cc | 3.11 | 0.00 | 0.003 | -0.003 | 31 | 1 |
| .... | .... | .... | .... | .... | .... | .... | .... |
|  |  |  |  |  |  |  |  |

|  | fairness metrics | KPI |
|---|---|---|
| fairness metrics | 1,000 | 0.914 |
| KPI | 0.914 | 1.000 |

FIG. 4

FINDING ROOT CAUSE FOR LOW KEY PERFORMANCE INDICATORS

BACKGROUND

The invention relates generally to improving machine-learning supported systems, and more specifically, to a computer-implemented method for identifying a change of an indicator value for a system of interdependent entities. The invention relates further to an indicator value analysis system for identifying a change of an indicator value for a system of interdependent entities, and a computer program product.

Controlling and managing complex systems continue to be a challenge in today's technical world, as well as in the organizations in which different groups have to perform certain tasks in order to achieve a joint goal using technical equipment. In particular, finding a weak link in interlinked systems if the envisioned goal is not reached at all or not reached in a predefined manner in the complex systems remains a challenge. A technical system working together may be seen as a (joint) system of interdependent entities. Such a system may be a large computing center with many independently operating computing systems, network routers, storage systems and the like in order to achieve a guaranteed service level, e.g., a guaranteed uptime providing a predefined capacity or throughput. Similarly, a logistics chain with a plurality of transport vehicles, warehouses, conveyer belts and the like may be seen as a system of interdependent entities. The same thinking may be applied to a group of people trying to achieve a common goal like processing a predefined number of orders or generate a predefined revenue number, thereby using technical equipment.

Thus, such systems of interdependent entities can be identified in almost all areas of today's technical world. Each distributed (computing) system may be seen as such a system of interdependent entities.

SUMMARY

In one aspect of the present invention, a method, a computer program product, and a system includes: (i) determining the indicator value; (ii) logging input data for the system of interdependent entities; (iii) logging scoring payload data and related results of a machine-learning model used as part of the system of interdependent entities, wherein the scoring payload data are derived from the input data; (iv) clustering the input data into a number of clusters resulting in defined clusters; (v) re-determining the indicator value for each defined cluster, resulting in a vector of re-calculated indicator values; (vi) calculating metric values of the machine-learning model for each defined cluster, resulting in a metric values vector; and (vii) determining correlation matrix values for a correlation matrix between the vector of re-determined indicator values and the metric values vector of the defined clusters.

According to one aspect of the present invention, a computer-implemented method for identifying a change of an indicator value for a system of interdependent entities may be provided. The method may comprise determining the indicator value, logging input data for the system of interdependent entities, logging scoring payload data and related results of a machine-learning model used as part of the system of interdependent entities, wherein the scoring payload data may be derived from the input data.

The method may also comprise clustering the input data into a number of clusters resulting in defined clusters, determining metric values of the machine-learning model by mapping each of the defined clusters onto the scoring payload data resulting in a vector of metric values, re-determining the indicator value for each defined cluster, resulting in a vector of re-calculated indicator values, and re-determining the indicator value for each defined cluster, resulting in a vector of re-determined indicator values.

Last but not least, the method may comprise determining correlation matrix values for a matrix between the vector of re-determined indicator values and the vector of the metric values for each of the defined clusters.

According to another aspect of the present invention, an indicator value analysis system for identifying a change of an indicator value for a system of interdependent entities may be provided. The system may comprise means for determining the indicator value, means for logging input data for the system of interdependent entities, and means for logging scoring payload data and related results of a machine-learning model used as part of the system of interdependent entities. Thereby, the scoring payload data may be derived from the input data.

The system may further comprise means for clustering the input data into a number of clusters resulting in defined clusters, means for determining metric values of the machine-learning model by mapping each of the defined clusters onto the scoring payload data resulting in a vector of metric values, and means for re-determining the indicator value for each defined cluster, resulting in a vector of re-determined indicator values.

Additionally, the method may comprise means for determining correlation matrix values for a matrix between the vector of re-determined indicator values and the vector of the metric values for each of the defined clusters.

BRIEF DESCRIPTION OF THE SEVERAL VIEWS OF THE DRAWINGS

FIG. 4 shows an exemplary table of values to discuss the general function of the proposed method;

DETAILED DESCRIPTION

Figure 1:
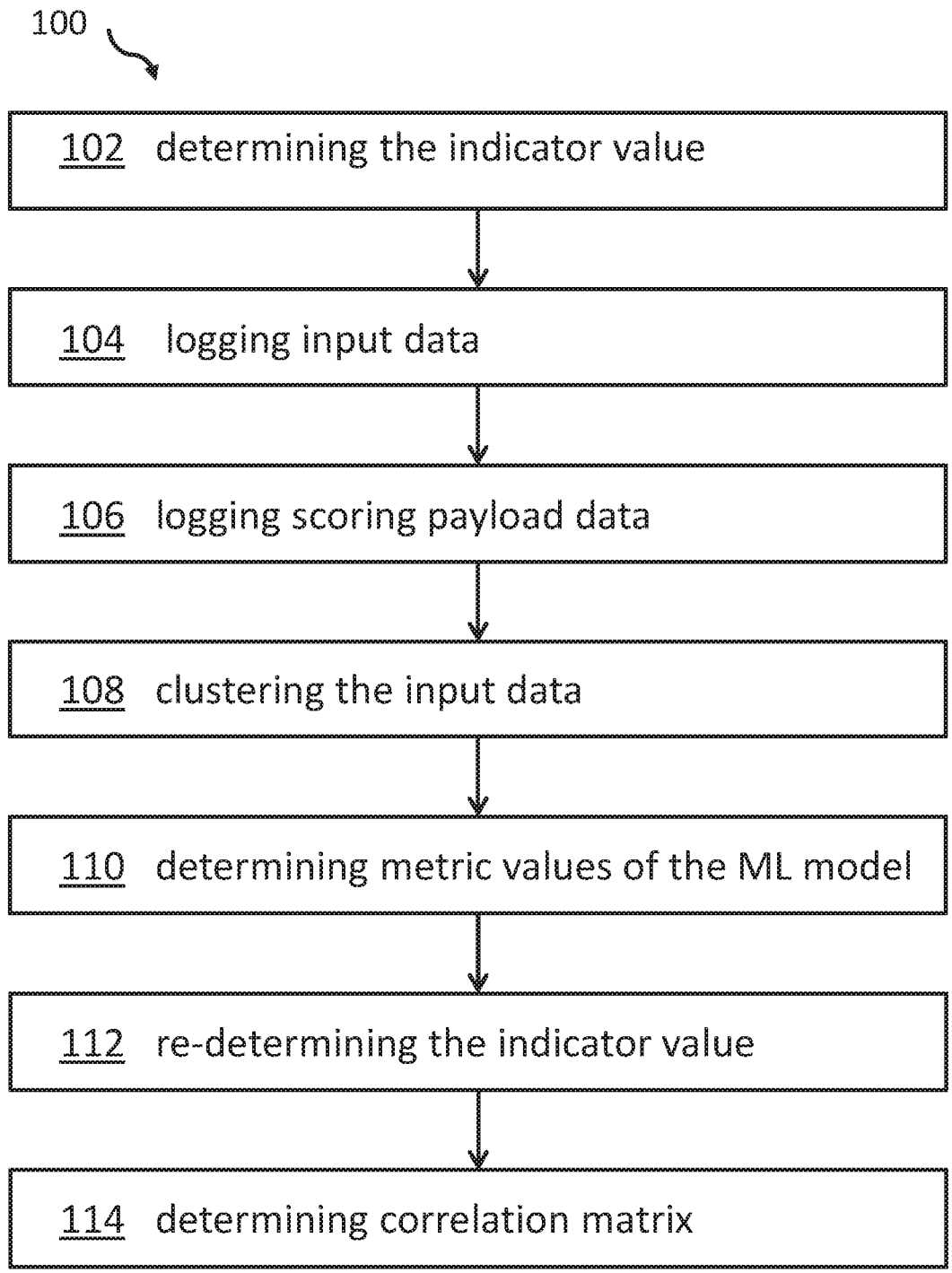
FIG. 1 shows a block diagram of an embodiment of the inventive computer-implemented method for identifying a change of an indicator value for a system of interdependent entities.

The performance—i.e., the ability to reach a predefined target, objective or, goal—may be measured by an indicator value, e.g., a key performance indicator (value). If business processes are measured using technical equipment, one may speak of business key performance indicator (business KPI or BKPI).

In this context, a couple of technologies are known, namely from, e.g., document CN 107659595 A. It describes a method for assessing the capacity of a distributed cluster processing a specific service. For that, the capacity of the distributed cluster processing system is assessed via resource parameters and constraints of performance indexes.

Document CN 110033191 A describes a system for analyzing commercial artificial intelligence by establishing a performance evaluation-improvement system with BI (business intelligence) analysis and performance evaluation and improvement function in a commercial artificial intelligence system.

However, the known technology is silent about how to efficiently identify input values to a complex system that negatively affect the performance indicator of the entire complex system. Therefore, it is an objective of the here proposed concept to identify such input values, so that a negative effect on the performance indicator of the entire complex system may be avoided.

The proposed computer-implemented method for identifying a change of an indicator value for a system of interdependent entities may offer multiple advantages, technical effects, contributions and/or improvements:

The here proposed concept may allow a straightforward analysis of a root cause in a system of interdependent entities if a performance indicator value is getting worse, e.g., decreases. The system of interdependent entities may comprise, as at least one entity, a machine-learning system. Thus, a correlation between input data to one or more of all entities and data that are used as input data for the machine-learning system (which is a component of the interdependent entities) may be built. On the other side, a correlation between the performance indicator value and a metric value for the machine-learning system may be built. For this, clusters of input data to the system may be determined, so as to identify which kind of input data influences the performance indicator value in a negative way under the influence of a specific metric value of the machine-learning system. A recalculation or simulation of the machine-learning metric value may be done in order to simulate different influence situations for differently applied machine-learning behaviors (using training data other than the originally used ones) in order to identify root causes for degrading performance indicator values.

Another advantage may be in the potentially gained insight that there is a lack of correlation between performance indicator values and values of a machine-learning model metric. The root cause of such situation may be that in reality the machine-learning system predictions are not taken into account in the overall process at all.

In a similar situation, it may be a result of the analysis process that the applied machine-learning model may be used incorrectly if the performance indicator values have the opposite correlation with values of model metrics than expected or anticipated.

Thus, the here proposed method may enlighten the analyst of a complex system under various aspects.

In the following, additional embodiments of the inventive concept, applicable for the method as well as for the related system—will be described.

According to one advantageous embodiment, the method may also comprise: upon determining that elements of the correlation matrix values may exceed a predefined correlation value, determining a dominant feature of the same cluster having the worst—in particular, the lowest—indicator value. The dominant feature may represent a specific cluster content and it may be used in order to react to the low indicator value, in particular a low performance indicator, and even more specific, a low business key performance indicator. Thus, with this, the method may be enabled to counter-react to miss-tuned interdependent systems including a machine-learning system and to identify a root cause for a misbehaving system. It may also be noted that a higher performance indicator value may be better—i.e., characterizing a better performing system—than a lower performance indicator value.

According to one useful embodiment of the method, the re-determination of the indicator values per cluster may also comprise selecting only a portion of records of the input data being part of the cluster. This step may reduce the number of data points per cluster in order to reduce the computational effort for the recalculation of the indicator value and the recalculated machine-learning metric value. This may be possible because the clustering step led to groups or clusters of input records with similar data vectors.

According to an advanced embodiment of the method, the metric value of the machine-learning model may comprise a plurality of types of metric values, comprising indicators of type accuracy, fairness, and/or drift. Of course, also other indicators of the machine-learning model may be used here. This may enable one to investigate the influence of the machine-learning system under different aspects regarding different input values, and thus different scoring payload data. Hence, a root cause for bad-performing systems may be investigated from different viewpoints so as to enable a 360° view to the interdependent entities and the related input value. Actually, the input data values may be measurement values from machines, throughput rates, production quality parameter values, and/or geo-positions of parcels in a logistics chain.

According to a further advanced embodiment of the method, the re-determination of the indicator value, the calculating the metric value of the machine-learning model, and the determination of correlation matrix values may be performed for each type of metric values. Also, this feature may enable a better understanding of the dynamics inside the system of interdependent entities.

According to an additionally advanced embodiment of the method, the indicator value may be a plurality of different indicator values, and the re-determination of the indicator value, the calculating the metric value of the machine-learning model, and the determination of the correlation matrix values may be performed for each of the plurality of different indicator values. Also this feature may enable a better understanding of the dynamics inside the system of interdependent entities to identify root-causes for bad-performing systems.

According to a useful embodiment of the method, the clustering may be based on a k-medoids (or PAM, i.e., Partitioning Around Medoids), k-means, or fuzzy c-means algorithms. It could be shown that these correlation functions may deliver good results in the root-cause determination process.

k-mediods is known as a classical partitioning technique of clustering that clusters the data set of n objects into k clusters, with the number k of clusters assumed known a priori. The "goodness" of the given value of k can be assessed with methods such as silhouette. Similar to the k-means algorithm, also k-mediods attempt to minimize the distance between points labeled to be in a cluster and a point designated as the center of that cluster. However, it is more robust to noise and outliers as compared to k-means because it minimizes a sum of pairwise dissimilarities instead of a sum of squared Euclidean distances.

According to an optimized embodiment, the method may comprise determining the indicator value continuously—in particular in regular or predetermined time intervals—throughout an operation of the system of interdependent entities and suppressing further steps of the method unless it may be determined that the indicator value has fallen below a predefined indicator threshold value. The continuous operation of the method may actually result in saving resources if the indicator value may indicate a good operation of the system of interdependent entities. In that way, the performance indicator is a range that is satisfactory for a good performance of the system of interdependent entities. Thus, additional steps—apart from determining the indicator value and comparing it to a threshold value—are not required because no critical situation has occurred.

According to a further allowed embodiment of the method, the indicator value may be determined based on the input data. Thus, the indicator value—e.g., (key) performance indicator value—may be determined by any suitable formula applied to the input values.

An even more advanced embodiment of the method may comprise determining a description of dominant values in the clusters and determining a recommendation—in particular to a user—based on the correlation matrix values. Thereby, the description of dominant values may require an interpretation—i.e., further analysis and determinations steps—of the data of the clusters. It may also involve range building for the input values, e.g., on determining an expectation value plus/minus a tolerance value of a distribution of input values, or similar.

Additionally—in a further embodiment—more advanced correlation finding methods may be applied, e.g., a multi-variant model.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

In the context of this description, the following conventions, terms and/or expressions may be used:

The term 'indicator value' may denote a typically numerical (alternatively an alpha-numerical value) indicative of a quality of a system of interdependent systems working together—i.e., collaborating—and achieve a common goal. The goal may be a process result, a manufacturing output of produced goods and/or their quality, a throughput of a logistics network and so on. The indicator value may also be interpreted as key performance indicator, KPI (value) or—in case of interrelated business processes supported by technical systems—business key performance indicator (BKPI).

The term 'system of interdependent entities' may denote a plurality of systems functioning together to achieve a common goal (compare to the definition of 'indicator value'). The interdependent entities may be typical systems (computer systems, manufacturing systems, test equipment, a sensor and actuator network, etc.; however, also virtual systems—e.g., virtual machines in a computing cluster—may be comprised in the definition of interdependent entities. In a special form, the plurality of entities may only comprise one system. The system may also comprise processes as entities that may potentially be supported by or implemented as physical (computing) systems.

The term 'input data' may denote a set of data values—e.g., an input vector—being used to function as input (control) signals to the entities. These input data may also be applied to the machine-learning system.

The term 'scoring payload data' may denote input data to the machine-learning system. This may be the same data as input to the systems/entities and/or also derived data by the entities.

The term 'related result' may denote a scoring or interference result—in case the ML (machine-learning) system is a classifier, e.g. in form of a neural network—of the ML system.

The term 'machine-learning model' (ML model) may denote a function executed by a machine-learning system which may be trained with training data in order to predict—by inference in case of a neural network—a result with a correctness value (e.g., probability to come up with the correct value). The training data may typically be annotated (for supervised machine-learning). As ML systems, regression system and neural networks may be considered.

The term 'metric value' may denote a numerical value expressing, e.g., a quality of the machine-learning model; different metrics may be used to assess the quality characteristic. This may, e.g., be a rate of false negative prediction for a given test data set. Similar quality criteria values may be derived for fairness and/or drift, i.e., how independent is a prediction from a certain parameter.

The term 'dominant feature' may denote a parameter—or a set thereof—influencing a dependency between the indicator value and input values to the system of interdependent entities. In an ideal case, the dominant feature may be isolated by clustering the input data already. The ML system may be instrumental in identifying the dominant feature, i.e., the element in the input record influencing the indicator value (i.e., KPI) over-proportional or with the strongest effect.

In the following, a detailed description of the figures will be given. All instructions in the figures are schematic. Firstly, a block diagram of an embodiment of the inventive computer-implemented method for identifying a change of an indicator value for a system of interdependent entities is given. Afterwards, further embodiments, as well as embodiments of the indicator value analysis system for identifying a change of an indicator value for a system of interdependent entities, will be described.

FIG. 1 shows a block diagram of an embodiment of the computer-implemented method 100 for identifying a change of an indicator value—in particular, a performance indicator, a key performance indicator or a business key performance indicator—for a system of interdependent entities. The entities may represent typical software server systems for supporting technical or business processes which may involve different technical systems or different departments of an enterprise. This may include, e.g., production systems/processes and/or transportation and/or distribution networks. On the other side, the entities may comprise different technical systems provided in a typical data center. However, also controllers for conveyer belts, transport systems, logistics systems, manufacturing systems, and/or quality assurance systems may be entities in the sense of this document.

The method 100 comprises determining, 102, the indicator value. This may optionally be performed on a continuous basis during the operation of the components (i.e., entities) of the system. The method 100 comprises also logging, 104—i.e., continuously storing, (transactional)—input data (e.g., in form of individual input records)—for the system of interdependent entities. These input data are typically used for a determination of the KPI value.

The method 100 also comprises logging, 106, scoring payload data and related results—in particular, scoring results—of a machine-learning model used as part of the system of interdependent entities. The scoring payload data are typically derived (or may be part of or a result of a function applied to the input data) from the input data.

The method 100 comprises additionally clustering, 108, the input data into a number of clusters resulting in defined clusters. The number of data points in these clusters may advantageously be reduced in order to perform the subsequent steps of the method 100 with less data, resulting in lower required computational power. However, the reduced number of data should still be representative of the complete group of data.

Furthermore, the method 100 comprises determining, 110, metric values of the machine-learning model by mapping each of the defined clusters onto the scoring payload data—e.g., using the transaction identifier from input data stored additionally in the scoring payload—resulting in a vector of metric values, and re-determining, 112, the indicator value for each of the defined cluster, resulting in a vector of re-calculated indicator values. An interdependency of these two vectors may exist. Thus, another step of the method 100 comprises determining, 114, correlation matrix values between the vector of re-determined indicator values and the vector of the metric values for each of the defined clusters. From these key influence factors, as well as influences from the chosen metric of the machine, a learning model may be analyzed in more detail, e.g., by visualizing the results, e.g., in a scatter-plot or other suitable graphics. From this, one may get an indication about the strength and direction of influence factors in a positive and/or negative way between the input values, the chosen model of the machine-learning system as well as the (key) performance indicator(s).

It should also be noted that the determination 110 of the metric values of the machine-learning model comprises an analysis of each scoring payload data cluster separately in order to produce a vector of metric values.

Figure 2:
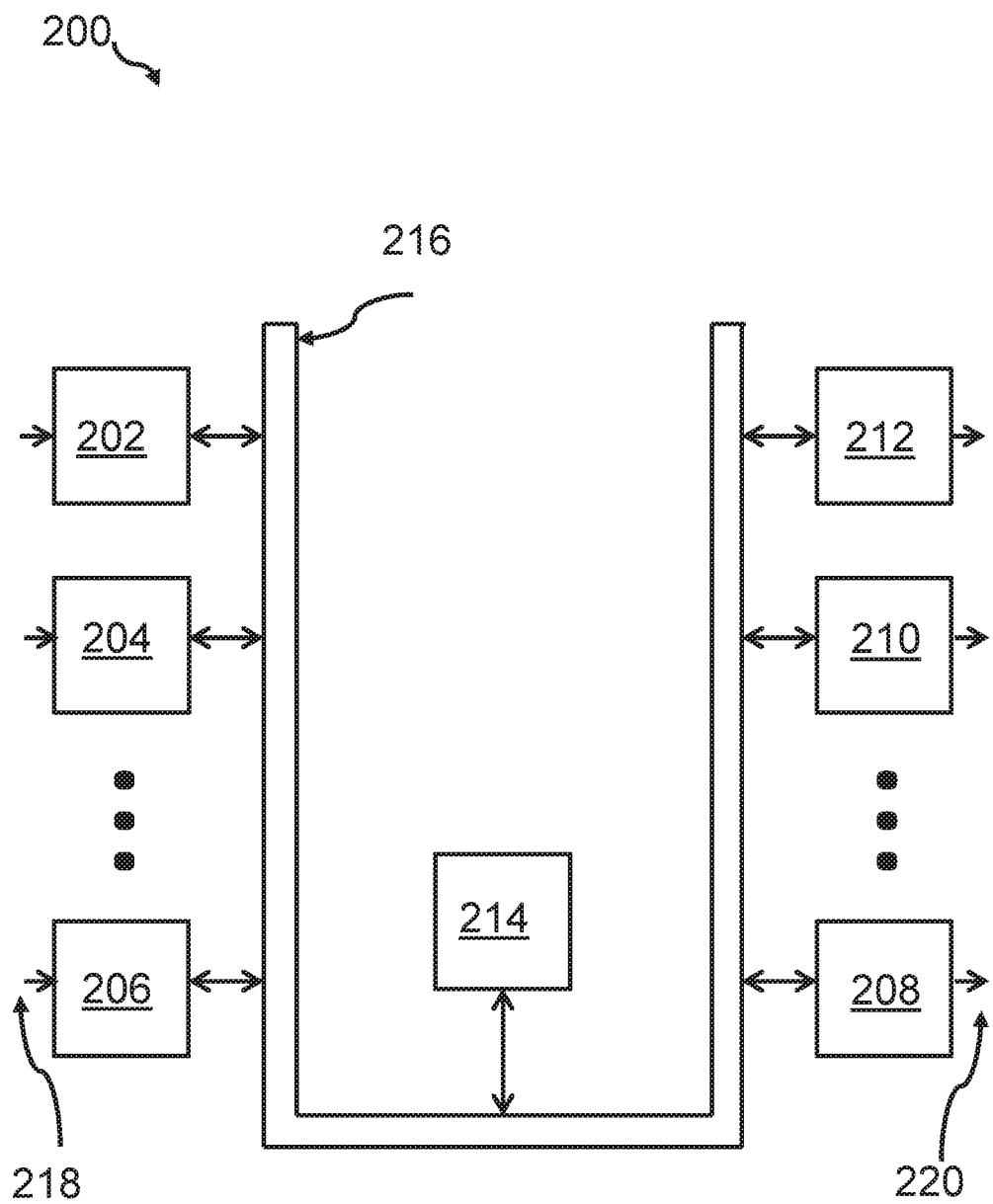
FIG. 2 shows a block diagram of an embodiment of a system of interdependent entities including a machine-learning system.

FIG. 2 shows a block diagram of an embodiment of a system 200 of interdependent entities 202, 204, . . . , 212 including a machine-learning system 214. The entities 202, 204, . . . , 212 or the respective supporting technical systems may receive input data 218 and related output data 220. In one way or the other, indicator values, indicative of a quality of the functioning of the system of independent entities, may be derived by a known method. The systems/entities 202, 204, . . . , 212 may be connected via a network or a message queuing (or bus) system 216. Although not shown, also the input data 218 may be received via the network 216. The network may enable a message exchange (e.g., supported by a message queuing system) between the respective entities. It may also be noted that the input data 218 may be directed unchanged to the machine-learning system 214 as scoring payload data. However, the machine-learning system may also receive output values derived from the system/entities 202, 204, . . . , 212. Additionally also other dependency models between the entities/related systems may be applied: e.g., sequential models, semi-sequential models (e.g., in a form of a Directed Acyclic Graph, DAG), and/or star-models.

Figure 3:
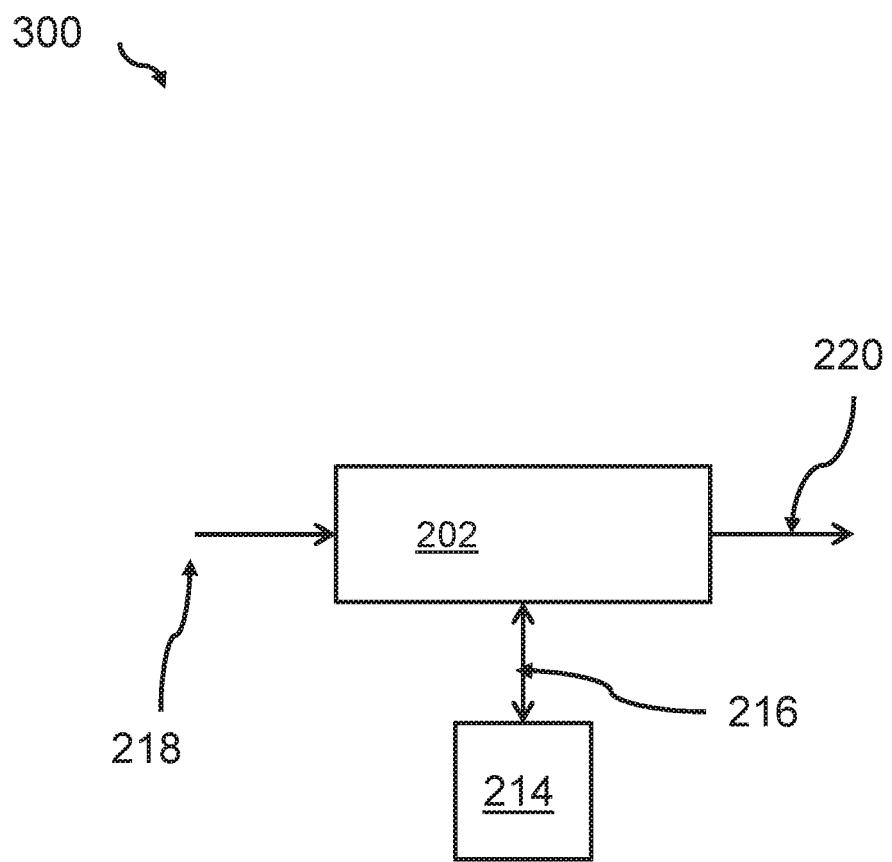
FIG. 3 shows a block diagram of a special embodiment of the system of interdependent entities including a machine-learning system with only one additional entity.

FIG. 3 shows a block diagram of a special embodiment 300 of the system of interdependent entities including a machine-learning system 214 with only one additional entity 202. Also in this case, an indicator value for the functioning of the entities/system 202 may be derived from the input data 218. The machine-learning system 214, which may receive its input data via the connection 216, may also receive the input data 218 and/or derived intermediate values of the entities/system 202 and, may also influence the functioning of the entities/system 202. This architecture may represent the simplest implementation of the more general approach according to FIG. 2.

FIG. 4 shows an exemplary table 400 to discuss the general function of the proposed method alongside some real numbers. The example is based on a credit approval computing system for different persons having various relevant scores. Alternatively, it may be imagined that instead of the credit scoring process a related system in a production environment and sensors for quality influencing production parameters may be used instead. However, for the usage comprehensibility, the credit scoring example would be discussed:

Five input records of a larger plurality of input records are shown, each comprising a flag for a credit approval, a credit type (e.g. mortgage, credit card), an interest rate, an interest value, processing costs (e.g., bank internal handling costs, refinancing costs, or computational costs for processing a credit request, or a combination of the different factors), achieved revenue, relevant score of the credit requestor, as well as, an indicator for the cluster of input data.

As indicator values (KPI) per cluster, the following exemplary values may be derived and expressed as the following KPI vector (506.03, −618.63, −343.43, 9710.00, 12.54). Based on a rule of thumb (heuristic rule), it may be determined that the first and the fourth element of the vector indicate good KPI's; consequently, the second, the third and the last KPI may represent non-favorable values for the KPI.

The parallel applied machine-learning system may derive from the input values (i.e., the records from the table 400), e.g., the following exemplary fairness metric value, expressed as ML vector: (0.7, 0.45, 0.4, 0.97, 0.5). For this metric, it may be assumed that the higher the values are, the higher the fairness is. Thus, the first and the fourth vector element may represent good fairness results, wherein the other elements of the vector—in particular, element 2, element 3 and element 5—represent bad fairness values. Now, a correlation between the KPI vector and the ML vector may be looked for.

A Pearson correlation step may result in the matrix 402. From such a matrix, a heat map may easily be derived and visually presented to a user for further decision-making. Also the dominant feature of the input data may be highlighted in the graphical form to the user and also a recommendation with the potential root-cause may be derived from these data. Thus, the user may re-adjust negative influence factors in the collaboration of the system's entities (or respective input data and their potential root cause(s)) in order to bring the operational quality indicator (i.e., the KPI) into an acceptable range.

Thus, a bad KPI (e.g., a value below a predefined threshold value) may indicate that a credit requestor associated with a particular relevant score may result only little additional revenue for the credit company. Thus, a potential recommendation may be determined as: "Avoid credits to requestors having a relevant score below XYZ!"

Figure 5:
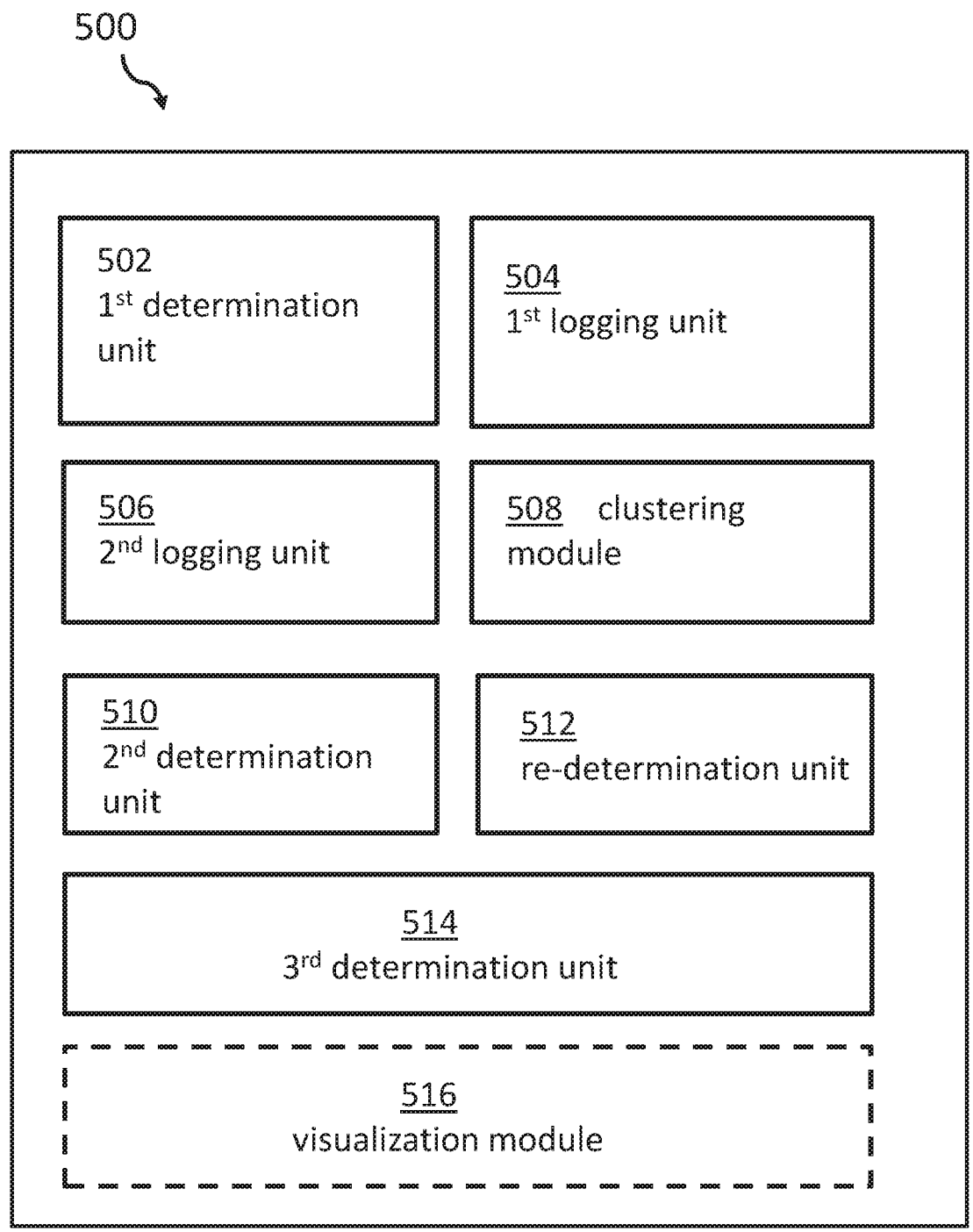
FIG. 5 shows a block diagram of an embodiment of the system for identifying a change of an indicator value for a system of interdependent entities.

For completeness reasons, FIG. 5 shows a block diagram of an exemplary indicator value analysis system 500 for identifying a change of an indicator value for a system of interdependent entities. The system 500 comprises means for determining—in particular, a first determination unit 502—the indicator value, means for logging—in particular, a first logging unit 504—input data for the system of interdependent entities, means for logging—in particular, a second logging unit 506—scoring payload data and related results of a machine-learning model used as part of the system of interdependent entities. Thereby, the scoring payload data are derived from the input data; the scoring payload data (i.e., the input data to the machine-learning system) may be identical to the input data to one or more of the interdependent entities/systems.

The system 500 comprises also means for clustering—in particular, a clustering module 508—the input data into a number of clusters resulting in defined clusters, means for determining—in particular, a second determination unit 510—metric values of the machine-learning model by mapping each of the defined clusters onto the scoring payload data resulting in a vector of metric values.

Furthermore, the system 500 comprises means for re-determining—in particular a re-determination unit 512—the indicator value for each defined cluster, resulting in a vector of re-calculated indicator values, and means for determining correlation matrix values—in particular a third determination unit 514—for a matrix between the vector of re-determined indicator values and the vector of the metric values for each of the defined clusters.

Additionally and optionally, the system 500 can comprise a visualization module 516 (means for visualizing) graphical dependency charts, heat maps, and recommendations (in verbal or graphical form).

Embodiments of the invention may be implemented together with virtually any type of computer, regardless of the platform being suitable for storing and/or executing program code.

Figure 6:
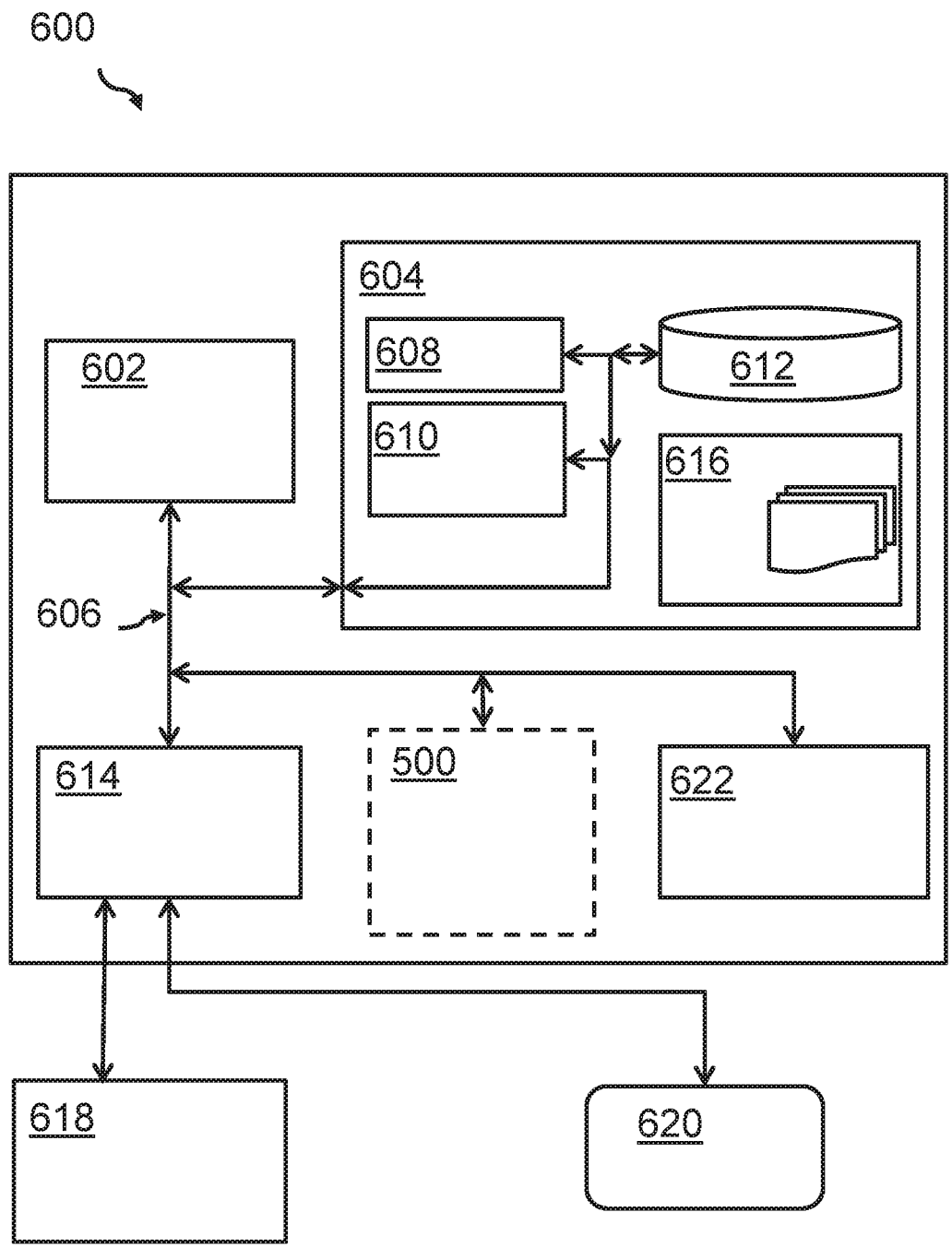
FIG. 6 shows an embodiment of a computing system comprising the system according to FIG. 5.

FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the indicator value analysis system 500 for identifying a change of an indicator value for a system of interdependent entities may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the here proposed concept may be summarized at least in part by the following statements. A computer-implemented method for identifying a change of an indicator value for a system of interdependent entities, the method comprising: determining the indicator value; logging input data for the system of interdependent entities; logging scoring payload data and related results of a machine-learning model used as part of the system of interdependent entities, wherein the scoring payload data are derived from the input data; clustering the input data into a number of clusters resulting in defined clusters; determining metric values of the machine-learning model by mapping each of the defined clusters onto the scoring payload data resulting in a vector of metric values; re-determining the indicator value for each defined cluster, resulting in a vector of re-calculated indicator values; and determining correlation matrix values for a correlation matrix between the vector of re-determined indicator values and the vector of the metric values for each of the defined clusters.

Some embodiments of the present invention further include, upon determining that elements of the correlation matrix values exceed a predefined correlation value, determining a dominant feature of the same cluster having the worst indicator value. And, according to some embodiments, re-determining the indicator value per cluster also comprises selecting only a portion of records of the input data being part of the cluster.

And further wherein the metric value of the machine-learning model comprises a plurality of types of metric values, comprising indicators of type accuracy, fairness, and/or drift and/or wherein the re-determination of the indicator value, the calculating the metric value of the machine-learning model, and the determination of correlation matrix values is performed for each type of metric values.

For some embodiments of the present invention, the indicator value is a plurality of different indicator values and wherein the re-determination of the indicator value, the calculating the metric value of the machine-learning model, and the determination of the correlation matrix values is performed for each of the plurality of different indicator values. And in some embodiments, the correlation function is a k-medoids correlation function, k-means, or fuzzy c-means algorithm. Some embodiments of the present invention may also include determining the indicator value continuously throughout an operation of the system of interdependent entities; and suppressing further steps of the method unless it is determined that the indicator value has fallen below a predefined indicator threshold value wherein the indicator value is determined based on the input data.

Some embodiments of the present invention may include determining a description of dominant values in the clusters; and determining a recommendation based on the correlation matrix values.

What is claimed is:

1. A computer-implemented method for identifying a change of an indicator value for a system of interdependent entities, the method comprising:

determining, based on initial input data, an initial key performance indicator (KPI) value, the KPI value representing operational quality of a system of interdependent entities, the system of interdependent entities including a machine-learning model as a component of the interdependent entities;

logging additional input data for each entity during subsequent operation of the system of interdependent entities;

deriving, from the additional input data, scoring payload data and related results of the machine-learning model, the related results being classifiers of a neural network of the machine-learning model;
clustering, based on similarity, the additional input data into a plurality of defined clusters;
determining a set of cluster-based KPI values for each cluster of the plurality of defined clusters;
generating a vector for the set of cluster-based KPI values;
calculating metric values of the machine-learning model by mapping each cluster onto the scoring payload data, resulting in a metric values vector; and
determining correlation matrix values for a correlation matrix between the vector of cluster-based KPI values and the metric values vector of the clusters.

2. The method according to claim 1, also comprising:
upon determining that elements of the correlation matrix values exceed a predefined correlation value, determining a dominant feature of a same cluster having a lowest indicator value.

3. The method according to claim 1, wherein determining the set of cluster-based KPI values also comprises selecting only a portion of records of the additional input data being part of a cluster.

4. The method according to claim 1, wherein the metric value of the machine-learning model comprises a plurality of types of metric values, comprising indicators of type accuracy, fairness, and/or drift.

5. The method according to claim 4, wherein the determining the set of cluster-based KPI values, the calculating the metric value of the machine-learning model, and the determination of correlation matrix values is performed for each type of metric values.

6. The method according to claim 1, wherein the KPI value is a plurality of different KPI values and wherein the determining the set of cluster-based KPI values, the calculating the metric value of the machine-learning model, and the determination of the correlation matrix values is performed for each of the plurality of different KPI values.

7. The method according to claim 1, wherein the correlation function is a k-medoids correlation function, k-means, or fuzzy c-means.

8. The method according to claim 1, also comprising:
determining the KPI value continuously throughout an operation of the system of interdependent entities; and
suppressing further steps of the method unless it is determined that the KPI value has fallen below a predefined KPI threshold value.

9. The method according to claim 1, also comprising:
determining a description of dominant values in the plurality of defined clusters; and
determining a recommendation based on the correlation matrix values.

10. A computer system for identifying a change of an indicator value for a system of interdependent entities, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to identify the change by:
determining, based on initial input data, an initial key performance indicator (KPI) value, the KPI value representing operational quality of a system of interdependent entities, the system of interdependent entities including a machine-learning model as a component of the interdependent entities;
logging additional input data for each entity during subsequent operation of the system of interdependent entities;
deriving, from the additional input data, scoring payload data and related results of the machine-learning model, the related results being classifiers of a neural network of the machine-learning model;
clustering, based on similarity, the additional input data into a plurality of defined clusters;
determining a set of cluster-based KPI values for each cluster of the plurality of defined clusters;
generating a vector for the set of cluster-based KPI values;
calculating metric values of the machine-learning model by mapping each cluster onto the scoring payload data, resulting in a metric values vector; and
determining correlation matrix values for a correlation matrix between the vector of cluster-based KPI values and the metric values vector of the defined clusters.

11. The computer system of claim 10, further causing the processor set to identify the change by:
upon determining that elements of the correlation matrix values exceed a predefined correlation value, determining a dominant feature of a same cluster having a lowest indicator value.

12. The computer system of claim 10, wherein determining the set of cluster-based KPI values also comprises selecting only a portion of records of the additional input data being part of a cluster.

13. The computer system of claim 10, wherein the metric value of the machine-learning model comprises a plurality of types of metric values, comprising indicators of type accuracy, fairness, and/or drift.

14. The computer system of claim 13, wherein the determining the set of cluster-based KPI values, the calculating the metric value of the machine-learning model, and the determination of correlation matrix values is performed for each type of metric values.

15. The computer system of claim 10, wherein the KPI value is a plurality of different KPI values and wherein the determining the set of cluster-based KPI values, the calculating the metric value of the machine-learning model, and the determination of the correlation matrix values is performed for each of the plurality of different KPI values.

16. The computer system of claim 10, wherein the correlation function is a k-medoids correlation function, k-means, or fuzzy c-means.

17. The computer system of claim 10, further causing the processor set to identify the change by:
determining the KPI value continuously throughout an operation of the system of interdependent entities; and
suppressing further steps of the method unless it is determined that the KPI value has fallen below a predefined KPI threshold value.

18. The computer system of claim 10, further causing the processor set to identify the change by:
determining a description of dominant values in the plurality of defined clusters; and
determining a recommendation based on the correlation matrix values.

19. A computer program product comprising a computer-readable storage medium having a set of instructions stored therein which, when executed by a processor, causes the processor to identify a change of an indicator value for a system of interdependent entities by:

- determining, based on initial input data, an initial key performance indicator (KPI) value, the KPI value representing operational quality of a system of interdependent entities, the system of interdependent entities including a machine-learning model as a component of the interdependent entities;
- logging additional input data for each entity during subsequent operation of the system of interdependent entities;
- deriving, from the additional input data, scoring payload data and related results of the machine-learning model, the related results being classifiers of a neural network of the machine-learning model;
- clustering, based on similarity, the additional input data into a plurality of defined clusters;
- determining a set of cluster-based KPI values for each cluster of the plurality of defined clusters;
- generating a vector for the set of cluster-based KPI values;
- calculating metric values of the machine-learning model by mapping each cluster onto the scoring payload data, resulting in a metric values vector; and
- determining correlation matrix values for a correlation matrix between the vector of cluster-based KPI values and the metric values vector of the clusters.

20. The computer program product of claim 19, further causing the processor set to identify the change of an indicator value for a system of interdependent entities by:

- determining the KPI value continuously throughout an operation of the system of interdependent entities; and
- suppressing further steps of the method unless it is determined that the KPI value has fallen below a predefined KPI threshold value.

* * * * *